United States Patent [19]

Labedan et al.

[11] Patent Number: 4,708,498
[45] Date of Patent: Nov. 24, 1987

[54] LOCALLY PRE-STRESSED ROLLING BEARING FOR MOUNTING ON A SHAFT IN A LATERAL DIRECTION

[75] Inventors: Jean-Denis Labedan; Michel Merle, both of Vierzon, France

[73] Assignee: Nadella, Vierzon, France

[21] Appl. No.: 893,340

[22] Filed: Aug. 5, 1986

[30] Foreign Application Priority Data

Aug. 6, 1985 [FR] France ............................... 85 12014

[51] Int. Cl.$^4$ .............................................. F16C 27/06
[52] U.S. Cl. .................................... 384/560; 384/570; 384/577; 384/582
[58] Field of Search ............... 384/560, 570, 582, 536, 384/577

[56] References Cited

U.S. PATENT DOCUMENTS

| | | | |
|---|---|---|---|
| 2,528,987 | 11/1950 | Ablett | 384/570 |
| 3,385,543 | 5/1968 | Jäkel et al. | 384/582 |
| 3,630,586 | 12/1971 | Pitner | 384/582 |
| 3,883,194 | 5/1975 | Pitner . | |
| 3,890,854 | 6/1975 | Pitner | 384/582 |

FOREIGN PATENT DOCUMENTS 2193443 2/1974 France .

Primary Examiner—Lenard A. Footland
Attorney, Agent, or Firm—Robert E. Burns; Emmanuel J. Lobato

[57] ABSTRACT

A roller bearing assembly having an outer case (1) which contains an elastically yieldable sleeve 2 in which is enclosed a thin elastically yieldable ring 3 whose inner surface acts as a raceway for rollers or needles (6) carried by the cage (7). The elastic ring has a plurality of angularly spaced apart regions discontinuities (4a, 4b) defining pre-stressed regions adapted to ensure, by a radial deformation, a localized gripping of the rollers or needles under the action of the sleeve when the roller bearing assembly is mounted on a shaft (8). The outer case (1), the sleeve (2), the roller bearing ring (3) and the cage (7) have an openable structure which permit their spreading being apart to an open for ensuring the mounting of the roller bearing assembly by a lateral engagement of its component parts on the shaft without ends of insertion thereon from either each of the shaft.

15 Claims, 9 Drawing Figures

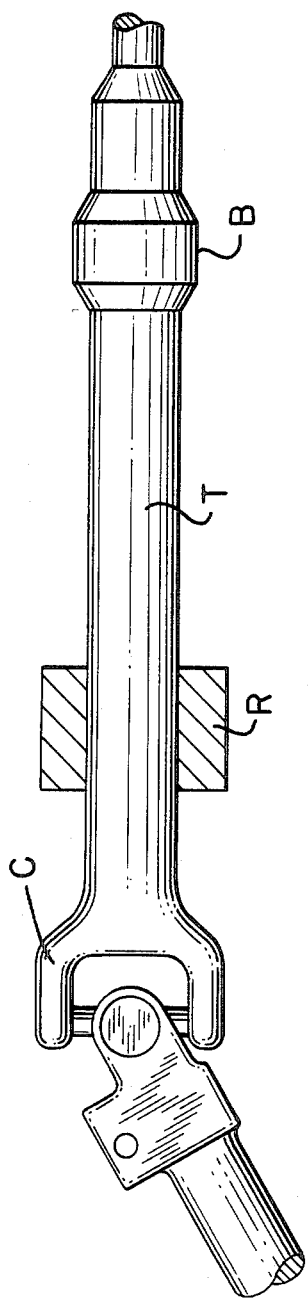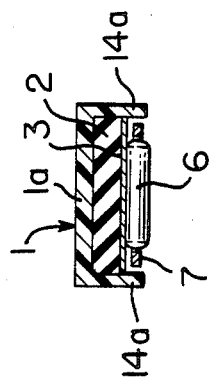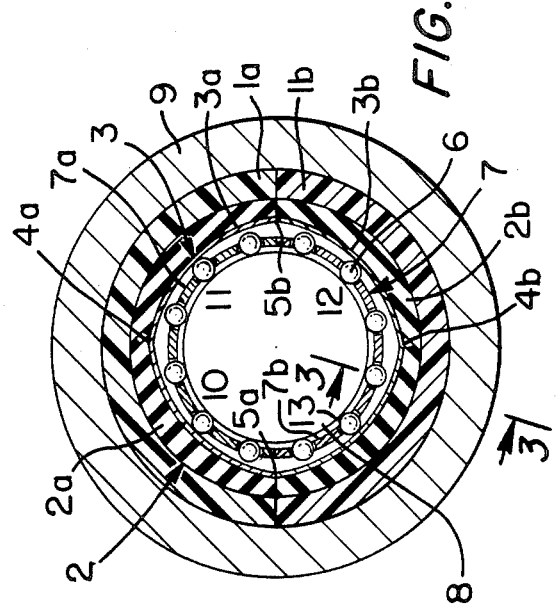

LOCALLY PRE-STRESSED ROLLING BEARING FOR MOUNTING ON A SHAFT IN A LATERAL DIRECTION

BACKGROUND OF THE INVENTION

The present invention relates to or roller bearings without clearance and more particularly to a roller bearing assembly having localized pre-stressing.

French Pat. No. 2193443 discloses a rolling bearing of the aforementioned type which comprises an outer case in which is mounted an elastically yieldable roller bearing ring, an elastomer sleeve is interposed between the case and the ring.

Mounted in the roller bearing ring are needles or rollers maintained in position by a cage, the ring has an irregular profile defining pre-stressed regions effective to locally grip the needles or rollers under the action of the elastomer sleeve when the rolling bearing or roller bearing assembly is mounted on a shaft, whereby any clearance in the roller bearing assembly is eliminated.

Rolling or roller bearings of the aforementioned type are fully satisfactory.

SUMMARY OF THE INVENTION

The invention therefore provides such a bearing assembly which, while retaining the qualities of conventional rolling bearings having localized pre-stressing, can be mounted on a shaft having two ends which have a diameter larger than the inner rolling bearing ring, for example on a steering column between the upper universal joint and the anti-theft collar of the column.

The ivnention therefore provides a roller bearing assembly without clearance comprising an outer case which contains an elastically yieldable sleeve in which is engaged a thin elastically yieldable sleeve in which is engaged a thin elastically yieldable ring whose inner surface, which acts as a raceway for the rollers or the needles carried by a cage, has in a plurality of angularly spaced regions discontinuities defining pre-stressed regions effective to ensure by a radial deformation, the localized gripping of the rollers or needles under the action of the elastically yieldable sleeve when the roller bearing assembly is mounted on a shaft, wherein the outer case, the sleeve, the bearing ring and the cage have a configuration and structure which permit their spreading apart to an open condition for mounting the rolling bearing on the shaft by a lateral engagement of these components parts on the shaft.

BRIEF DESCRIPTION OF THE DRAWING C

A better understanding of the invention will be had from the following description, which is given solely by way of example with reference to the accompanying drawings, in which:

FIG. 1 is a diagrammatic view of an automobile vehicle steering column, showing the placement of the mounting of the roller bearing assembly according to the invention;

FIG. 2 is a cross-sectional view of a first embodiment of the roller bearing assembly according to the invention;

FIG. 3 is a sectional view taken on line 3—3 of FIG. 2;

DESCRIPTION OF THE PREFERRED EMBODIMENTS

Figure 4:
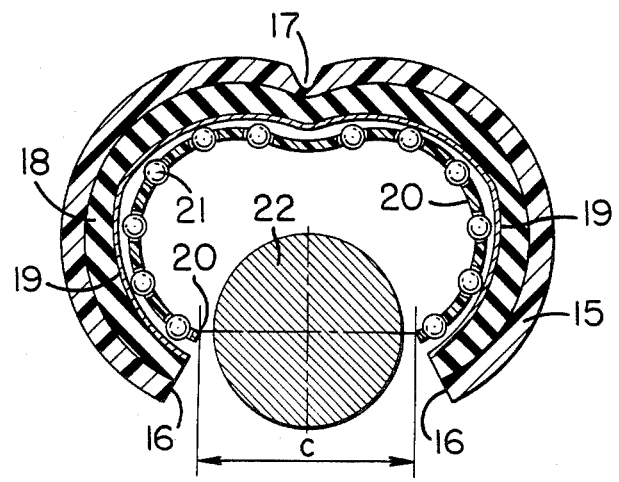
FIG. 4 is a cross-sectional view similar to FIG. 2 of another embodiment of a roller bearing assembly according to the invention, in the course of being on mounted on a shaft.

FIG. 1 shows by way of example a steering column whose section T carrying the steering wheel (not shown) includes at one of its ends a yoke C of a universal joint and at its opposite end an anti-theft collar B, these two elements are made either in one piece with the section T or rendered rigid therewith in such manner as to be incapable of being removed from the section T and thus constituting at the ends of the section T parts whose diameter exceeds the diameter of the rest of the column.

When a rolling bearing R is desired to be mounted at a place located between the two aforementioned elements, a rolling bearing of conventional type must be placed in position from one of the ends before the forming or the mounting of one of the aforementioned elements having a larger diameter, which gives rise to problems, in particular when the subsequent treatment of the column requires elevated temperatures which some component parts of the rolling bearing cannot resist.

In order to overcome these drawbacks, the rolling bearing shown in FIG. 2 is made in two parts.

It comprises an outer case 1 in two parts 1a, 1b, of semi-circular shape and in contact with each other by their ends, these parts being made for example from a rigid plastics material.

A sleeve 2 of an elastomer, also in two parts 2a, 2b of a shape similar to that of the two parts 1a, 1b of the case 1, is interposed between the latter and a thin steel rolling bearing ring 3.

The ring 3 is formed by two semi-rings 3a, 3b.

Each semi-ring has in the midpart thereof an angular deformation 4a, 4b so that, when the two semi-rings 3a, 3b are assembled, the ring formed thereby has four discontinuities in the raceway surface, namely deformations 4a and 4b and regions 5a, 5b of contact between the ends of the semi-rings.

The rolling bearing of FIG. 2 is completed by needles or rollers 6 carried by a cage 7 which is also in two parts 7a, 7b.

A rolling bearing constructed in this way can be easily mounted on a shaft 8 of the type shown in FIG. 1, merely by bringing the two parts of each of the elements constituting the bearing assembly around this shaft.

The immobilization of these elements of the bearing is ensured by engagement in a cavity provided in a mount 9.

The needles or rollers 6 are then pre-stressed between the shaft 8 and the rolling bearing ring 3 in the regions 10, 11, 12, 13 between the discontinuities 4a, 4b, 5a, 5b of the bearing ring 3.

As can be seen in FIG. 3, the outer case 1 comprises lateral flanges, such as the flanges 14a of the part 1a of this case. These flanges are adapted to axially maintain the component parts making up the bearing.

A modificiation of the rolling bearing of FIG. 3 is shown in FIG. 4.

In order to facilitate the positioning of the rolling bearing, the latter includes a case 15 in a single piece with open ends 16 and also having, at equal distances from these ends, a thinner region 17 constituting a hinge.

Moreover, the rolling bearing of FIG. 4 includes a sleeve 18 of elastomer, a rolling bearing ring 19 and a cage 20 maintaining the rolling elements 21 which is of similar shape to that of the case 15.

The mounting of the rolling bearing just described on a shaft 22 is achieved by spreading apart the ends 16 of the case 15 and the corresponding ends of the other component parts constituting the bearing assembly to such extent as to permit the engagement of the bearing assembly around the shaft.

The rolling bearing of FIG. 4 is maintained mounted on the shaft 22 by engagement in a cavity of a fixed member (not shown).

In the present embodiment, the cage 20 maintaining the rolling elements 21 is made from a plastics material which is flexible enough to conform to the general shape of the bearing before it is assembled.

As concerns the rolling bearing ring 19, it may be made in one part, as in the embodiment of FIG. 4, or in two parts articulated together in the region of the hinge 17 of the case 15.

Figure 5:
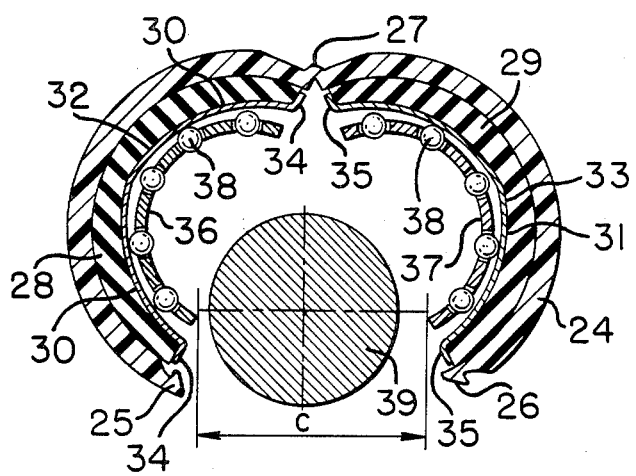
FIG. 5 is a view similar to FIG. 4, of a modification of the roller bearing assembly shown in the last-mentioned Figure.

The rolling bearing shown in FIG. 5 comprises an outer case 24 in a single piece, having open ends provided with complementary hooking elements 25, 26. The case 24 has in its intermediate portion a thinner region constituting a hinge 27. In the case 24 constructed in this way there are. mounted two separate elements 28, 29 of elastomer which have a roughly semi-circular shape and are adapted to constitute a sleeve when the bearing is closed. Each element 28, 29 is associated with a semi-ring 30, 31 having in the mid-part thereof a corresponding discontinuity of curvature 32, 33. Each semi-ring 30, 31 includes end flanges 34, 35 which extend outwardly and are adapted to maintain the two corresponding semi-sleeves 28, 29 in position in the respective portions of the case 24 located on each side of the articulation hinge 27.

The rolling bearing is completed by two separate semicages 36, 37 each carrying rolling elements 38, such as needles or rollers.

The rolling bearing of FIG. 5 may be mounted on a shaft 39 by spreading apart the ends of the case 24 so as to permit the engagement of the shaft, then bringing the two portions of the case 24 together and closing the component parts of the bearing contained thereby onto the shaft.

The interengagement of the hooking element 25 and 26 enables the assembly thus formed to hold together before it is mounted in a cavity corresponding to that defined by the mount 9 of FIG. 2.

It will be understood that hooking elements may also be provided on the outer case 1 in two parts of the bearing of FIG. 2 or on the outer case of the bearing of FIG. 4.

In all the embodiments just described, the component parts of the rolling bearing according to the invention must be maintained within the bearing case.

Figure 6:
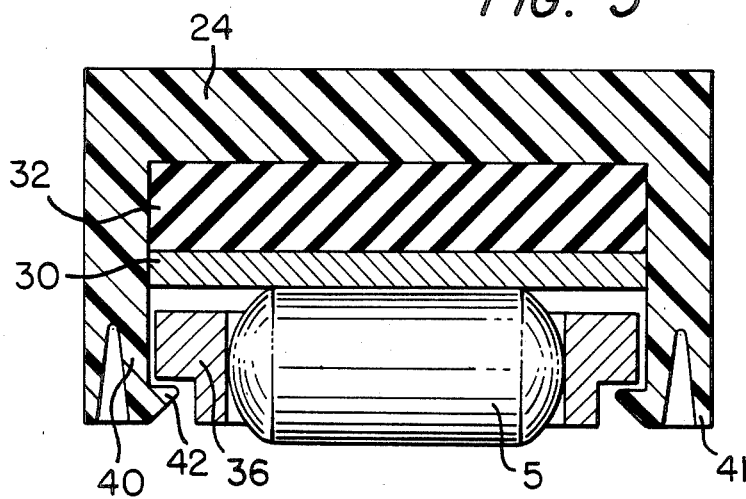
FIG. 6 is a cross-sectional view to an enlarged scale of a roller bearing assembly according to the invention showing the means for retaining the cage.
Figure 7:
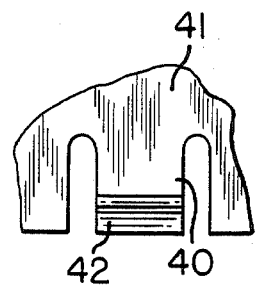
FIG. 7 is a partial side elevational view of a detail of FIG. 6.

In FIG. 6, there is shown an embodiment of means for maintaining the component parts of the bearing in the case. These maintaining means are considered as being applied to the bearing shown in FIG. 5, but they are of course applicable to all the embodiments of the bearing according to the invention.

They comprise lateral lugs 40 provided on the inwardly extending flanges 41 of the case 24 and including retaining ledges or projections 42 for the corresponding part of the cage 36 and consequently all the component parts located between this case and the case 24.

The lugs 40 may be, as illustrated in FIG. 6, arranged at equal intervals on the periphery of the flanges 41 of the case.

The system for hooking the case described with reference to FIG. 5 is also compatible with various cage systems, whether the cage be of plastics material as that shown in FIG. 4, or of formed steel, in which case it concerns a cage in two parts such as that of FIG. 5.

Figure 8:
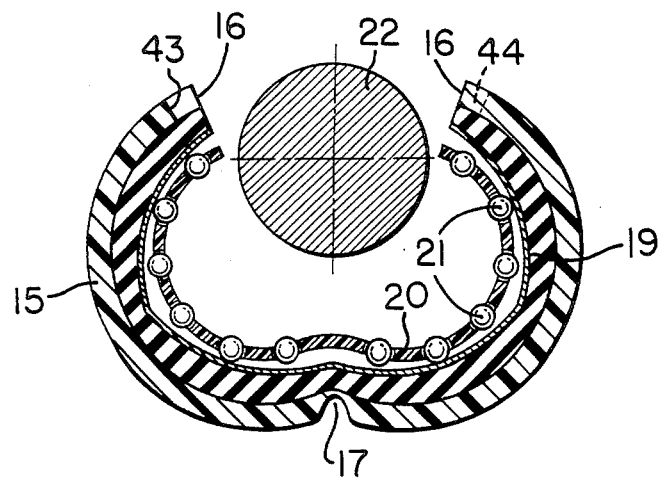
FIG. 8 is a sectional view taken along line 8—8 of FIG. 9 of means for axially retaining the ends of the outer case of a roller bearing assembly according to the invention.
Figure 9:
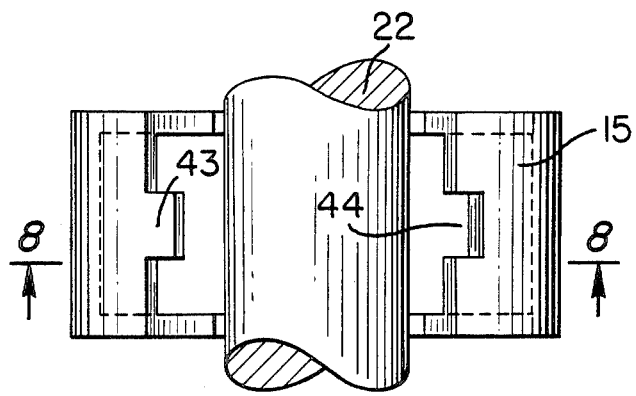
FIG. 9 is a plan view of a roller bearing assembly according to the invention, in the course of the mounting thereof, provided with means for axially maintaining the ends of the outer case.

The rolling bearing shown in FIGS. 8 and 9 is similar to that described with reference to FIG. 4, except that its outer case 15 comprises at its end 16 complementary means 43, 44 adapted to cooperate when the ends 16 of the case come into mutual contact so as to axially maintain these ends.

These maintaining means are formed for example by a tab 43 provided at one of the ends 16 and adapted to be engaged in a notch 44 provided in the opposite end 16. The number of tabs and notches may be more than one. It will be understood that such an axial maintaining means may also be provided at the ends of parts, such as the parts 1a, 1b of the case in two parts of the rolling bearing shown in FIG. 2.

What is claimed is:

1. A radial roller bearing assembly without clearance comprising, an outer case, as elastically yieldable sleeve in the case, a thin elastically yieldable ring in the sleeve and having an inner surface defining a raceway, a cage, roller elements carried by the cage and disposed within the ring for rolling contact with the raceway, the ring having in a plurality of angularly spaced apart regions of discontinuities defining pre-stressed regions of the raceway effective to ensure radial deformation for effecting localized gripping of the roller elements in response to action of the sleeve when the roller bearing assembly is mounted on a shaft, the outer case, the sleeve, the ring and the cage each having means on each of the outer case, the sleeve, the ring and the cage for permitting opening thereof laterally for mounting of the roller bearing assembly by a lateral engagement of the roller bearing assembly circumferentially on said shaft between opposite ends thereof without need of slipping the roller bearing assembly over one of the ends of said shaft.

2. A roller bearing assembly according to claim 1, wherein the outer case, the sleeve, the ring and the cage are each constituted by two pivotally connected parts in contact at free ends thereof, a mount defining a cavity in which the outer case is mounted for immobilizing said free ends with respect to each other.

3. A roller bearing assembly according to claim 2, wherein the outer case is made in a single piece having a split and openable free ends and having a region of reduced thickness constituting a hinge at equal distances from said free ends.

4. A roller bearing assembly according to claim 3, wherein the sleeve, the ring and the cage are also made in a single piece having a split and openable free ends and have a shape similar to the shape of the outer case.

5. A roller bearing assembly according to claim 3, wherein the ring is made in two parts and has an articulation pivotally interconnecting the two parts.

6. A roller bearing assembly according to claim 3, wherein the sleeve is made of an elastomer, the ring and the cage are made in two separate parts, and each of said two parts is disposed in a corresponding portion of the outer case.

7. A roller bearing assembly according to claim 3, wherein the free ends of the parts constituting the outer case are provided with complementary hooking elements enabling the roller bearing assembly to hold together before it is mounted in said cavity of said mount.

8. A roller bearing assembly according to claim 7, wherein two semi-rings each have at ends thereof an outwardly extending flange at each end for maintaining the corresponding semi-sleeve in position in respective portions of the outer case located on each side of the hinge.

9. A roller bearing assembly according to claim 3, wherein the outer case comprises, at free ends thereof mutual contact in an assembled condition of the roller bearing assembly, and means for axially maintaining the ends of the outer case in contact.

10. A roller bearing assembly according to claim 2, wherein the free ends of the two parts of the outer case are in mutual contact in an assembled condition of the roller bearing assembly, and comprise means for axially maintaining the ends of the two parts of the outer case.

11. A roller bearing assembly according to claim 10, wherein said axially maintaining means comprise at least one tab provided at one of the ends of the case and a notch provided in the opposite end of the case, in which the tab is engaged.

12. A roller bearing assembly according to claim 10, wherein said axially maintaining means comprise at least one tab provided at one of the ends of the case and a notch provided in the opposite end of the case, and said tab being engaged in said notch.

13. A roller bearing assembly according to claim 2, wherein the free ends of the two parts constituting the outer case each has complementary hooking elements enabling the roller bearing assembly to hold together before it is mounted in said mount cavity.

14. A roller bearing assembly according to claim 1, further comprising maintaining means for maintaining said sleeve, said ring and said cage within said case.

15. A roller bearing assembly according to claim 14, wherein said maintaining means comprise inwardly extending peripheral flanges provided on the outer case, and on the inwardly extending flanges lateral lugs including corresponding projections for retaining the cage and the roller elements, the ring and the sleeve located between the cage and the outer case.

* * * * *